United States Patent Office 2,892,847
Patented June 30, 1959

2,892,847

BENZOFURAN-DERIVATIVES

Arthur F. Wagner, Princeton, N.J., assignor to Merck & Co., Inc., Rahway, N.J., a corporation of New Jersey No Drawing. Application February 19, 1957
Serial No. 641,039

3 Claims. (Cl. 260—346.2)

This invention relates to new phenolic organic compounds and more particularly to phenolic benzofurans. In one of its more particular aspects this invention relates to benzofurans substituted with a hydroxyphenyl radical.

The new compounds of this invention are the 2-(hydroxyphenyl) derivatives of benzofuran having the following generic formula:

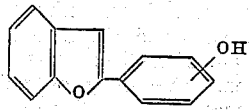

wherein the hydroxyl group may be attached to the phenyl radical in either the 2-, 3- or 4-position.

These compounds find utility as antioxidants and are especially useful as antioxidants to be added to organic compounds and mixtures thereof which are subject to deterioration in the presence of air or oxygen and as rust inhibitors.

In addition these compounds possess unexpected vitamin-like activity as evidenced by the property of preventing hemolysis by dialuric acid of red blood cells from vitamin E-deficient rats. Hemolysis assays conducted using 2-(4-hydroxyphenyl) benzofuran in a concentration of 50 µg. per ml., for example, indicate that 0.01 ml. of this concentration of the compound is effective to prevent hemolysis by dialuric acid. Otherwise stated, 0.5 µg. of the compound prevented hemolysis in the standard test. This activity falls in the range of that of dl α-tocopherol.

These compounds may be prepared starting from hydroxyaldehydes in accordance with a synthetic scheme which may be illustrated with respect to the 2-hydroxy derivative in the following sequence of reactions:

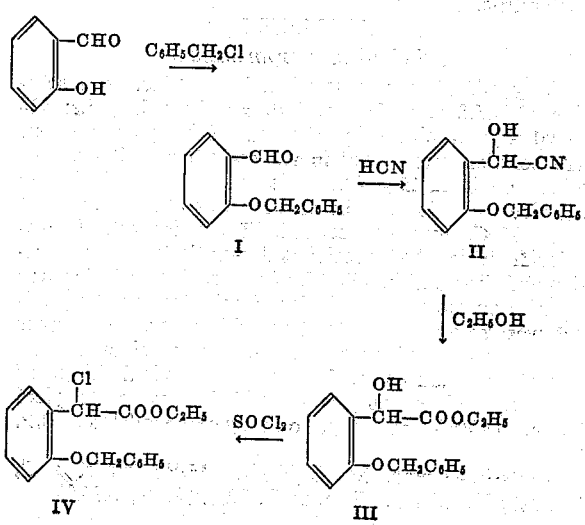

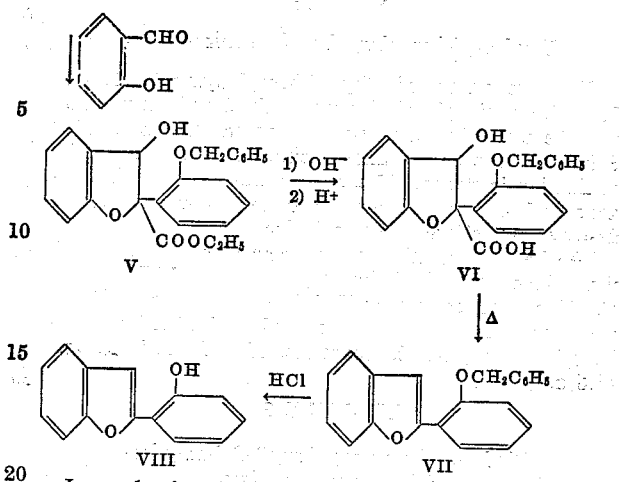

In conducting the above-illustrated conversions salicylaldehyde is reacted with benzyl chloride in the presence of a base such as sodium methylate to yield 2-benzyloxybenzaldehyde (I) which is then reacted with hydrocyanic acid to give the corresponding cyanohydrin, α-(2-benzyloxyphenyl)-α-hydroxyacetonitrile (II). The cyanohydrin (II) is then converted to the ester with ethanol and dry hydrogen chloride yielding ethyl o-benzyloxymandelate (III). The resulting mandelic ester (III) is chlorinated with thionyl chloride to give ethyl α-(2-benzyloxyphenyl)-α-chloroacetate (IV). This compound is a novel composition of matter and is of particular utility as a chemical intermediate because of its reactive chlorine atom. Condensation of ethyl α-(2-benzyloxyphenyl)-α-chloroacetate (IV) with salicylaldehyde using a catalyst such as potassium carbonate yields ethyl 2-(2-benzyloxyphenyl)-2, 3-dihydro-3-hydroxy-coumarilate (V). Saponification with a base such as sodium or potassium hydroxide followed by acidification with an acid such as hydrochloric acid then gives the corresponding coumarilic acid, 2-(2-benzyloxyphenyl)-2, 3-dihydro-3-hydroxycoumarilic acid (VI). 2-(2-benzyloxyphenyl)benzofuran (VII) is then formed by heating the carboxylic acid in a suitable solvent, for example, quinoline, which results in decarboxylation and dehydration of the coumarilic acid. Debenzylation of this benzyloxyphenyl benzofuran by treatment with a debenzylating agent such as hydrochloric acid gives the desired 2-(2-hydroxyphenyl)benzofuran (VIII).

By a similar reaction scheme 2-(3-hydroxyphenyl)benzofuran and 2-(4-hydroxyphenyl)benzofuran may also be prepared.

The following series of examples are included for purposes of illustration only and not to be construed as in any way limiting the scope of this invention. The first series illustrates the preparation of 2-(4-hydroxyphenyl) benzofuran by the process of this invention.

EXAMPLE 1

Ethyl 4-benzyloxymandelate

Seventy-four grams of ethyl 4-hydroxymandelate, prepared according to the method described by Ladenburg, Folkers and Major, J. Am. Chem. Soc. 58, 1292 (1936), was dissolved in 600 ml. of methyl ethyl ketone, 52 g. of potassium carbonate and 65 g. of benzyl bromide was added and the reaction mixture was stirred and refluxed for four hours.

The reaction mixture was cooled and concentrated in vacuo. The residue with diluted with 500 ml. of water and the product was isolated by filtration. The product was washed with water and then dried in vacuo at 60° C. The yield of ethyl 4-benzyloxymandelate, M.P. 84–87° C.

was 83 g. (77%). On recrystallization of the product from hot Skellysolve C, the melting point was raised to 91–93° C.

EXAMPLE 2

Ethyl α-(4-benzyloxyphenyl)-α-chloroacetate

Sixty-five grams of ethyl 4-benzyloxymandelate and 230 ml. of thionyl chloride were mixed and the reaction mixture was allowed to stand at room temperature for 3 hours. The excess thionyl chloride was removed by distillation in vacuo. The residue was taken up in benzene and a small amount of methanol was added to destroy any residual thionyl chloride.

The benzene solution was concentrated in vacuo, and the residue crystallized slowly; yield 71.7 g., M.P. 44–49° C. The product was purified by recrystallization from petroleum benzene. The yield of purified ethyl α-(4-benzyloxyphenyl)-α-chloroacetate, M.P. 50–52° C., was 48.6 g.

EXAMPLE 3

Ethyl 2-(4-benzyloxyphenyl)-2,3-dihydro-3-hydroxycoumarilate

A mixture of 2.1 g. (0.007 mole) of ethyl α-(4-benzyloxyphenyl)-α-chloroacetate, 0.9 g. (0.0075 mole) of salicylaldehyde, 144 mg. (0.0009 mole) of potassium iodide, and 1.2 g. (0.009 mole) of potassium carbonate in 10 ml. of dry methyl ethyl ketone was refluxed for 4 hours. The solvent was removed under reduced pressure, and the residue was taken up in 40 ml. of water. The resulting mixture was extracted twice with ether. The combined ether extracts were washed successively with aqueous potassium carbonate solution, aqueous ammonium sulfate solution, and with water. They were dried and concentrated to dryness. The yield of oily residue was 2.6 g. (96%).

EXAMPLE 4

2-(4-benzyloxyphenyl)-2,3-dihydro-3-hydroxycoumarilic acid

A solution of 2.5 g. of ethyl 2-(4-benzyloxyphenyl)-2,3-dihydro-3-hydroxycoumarilate and 1 g. of potassium hydroxide in 50 ml. of methanol was refluxed for ¾ hour. The mixture was cooled and the yellow solid was filtered. It was dissolved in 150 ml. of hot water; the solution was cooled and acidified to pH 2 with dilute hydrochloric acid. The precipitate which formed was filtered, washed and dried, and weighed 1.3 g. (55%); M.P. 170–175° C. It was recrystallized from a mixture of ethylene dichloride and petroleum ether; M.P. 176–178° C.

EXAMPLE 5

2-(4-benzyloxyphenyl)benzofuran

A solution of 1 g. of 2-(4-benzyloxyphenyl)-2,3-dihydro-3-hydroxycoumarilic acid in 20 ml. of quinoline was heated at 200° C. for 20 minutes. The temperature was raised to 240° C. and maintained there for an additional 20 minutes. The mixture was cooled and a solid crystallized. A mixture of 25 ml. of ether and 75 ml. solid was centrifuged. It was washed further with petroleum ether and was dried. The yield of product was 0.44 g. (53%); M.P. 177–179° C.

The mother liquors were combined, diluted with ether, and were washed with dilute hydrochloric acid. The ether layer was washed three times with water and was dried and concentrated. The residue was extracted with petroleum ether leaving 0.2 g. (24%) of solid, M.P. 171–176° C. The total yield was thus 77%.

After being recrystallized from ethanol, the product melted at 180–180.5° C.

EXAMPLE 6

2-(4-hydroxyphenyl)benzofuran

A solution of 420 mg. of 2-(4-benzyloxyphenyl)benzofuran in 28 ml. of glacial acetic acid and 9 ml. of concentrated hydrochloric acid was refluxed for 1 hour. The reaction mixture was cooled and diluted with an equal volume of water. The product that separated was filtered, washed, and dried, and weighed 250 mg. (85%); M.P. 187–189° C. On several recrystallizations from a mixture of alcohol and water the solid melted at 193–194° C.

*Analysis.*—Calcd. for $C_{14}H_{10}O_2$: C, 79.98%; H, 4.80%. Found: C, 79.88%; H, 5.09%.

ULTRAVIOLET

Plateau at 235–238 mμ, E% 190; λ max. 246 mμ, E% 180; λ max. 252 mμ, E% 130; λ max. 308 mμ, E% 1500.

INFRA-RED (SOLID STATE)

λ max. 2.98 μ (OH); 6.2 μ (phenyl) 6.62 μ (phenyl), 12–13 μ (phenyl).

The following series of examples illustrates the preparation of 2-(2-hydroxyphenyl)benzofuran.

EXAMPLE 7

2-benzyloxybenzaldehyde

Fifty-four grams of sodium methylate was dissolved in 400 ml. of methanol and 122 g. (1 mole) of salicylaldehyde in 100 ml. of methanol was added slowly to the stirred solution. Then 10 g. of sodium iodide was added to the mixture. The reaction mixture was stirred and refluxed while 126 g. (1 mole) of benzyl chloride was added slowly. The reaction mixture was heated at reflux for five hours and then filtered and concentrated in vacuo. The residue was treated with ether and the mixture was filtered. The ether solution was concentrated in vacuo to yield 199 g. of oil which was distilled to yield 134 g. (63%) of 2-benzyloxy-benzaldehyde, B.P. 134–139° C./200–300 μ.

EXAMPLE 8

α-(2-benzyloxyphenyl)-α-hydroxyacetonitrile

A solution of 134 g. (0.63 mole) of 2-benzyloxy benzaldehyde in 600 ml. of ether was added to a solution of 78 g. (1.2 moles) of potassium cyanide and 66 g. (1.2 moles) of ammonium chloride in 330 ml. of water. The combined phases were stirred in a Morton flask overnight at room temperature.

The ether phase was separated and the aqueous phase was extracted with 300 ml. of ether. The combined ether phases were washed with water, dried over anhydrous magnesium sulfate, filtered and concentrated in vacuo to yield 145.8 g. of α-(2-benzyloxyphenyl)-α-hydroxyacetonitrile.

EXAMPLE 9

Ethyl o-benzyloxymandelate

Forty ml. of anhydrous ethanol was added to a solution of 145.8 g. (0.61 mole) of α-(2-benzyloxyphenyl)-α-hydroxyacetonitrile in 250 ml. of anhydrous ether. The solution was cooled in an ice-bath and 500 ml. of ether containing 25 g. (0.7 mole) of anhydrous hydrogen chloride was added. The solution was allowed to stand at ca. 5° C. over the weekend. The imino ester hydrochloride which had precipitated was isolated by filtration and dissolved in 500 ml. of water. The solution was warmed on the steam bath for 10 minutes and the product was isolated by extraction with ether. The ether solution was dried over anhydrous magnesium sulfate, filtered and concentrated in vacuo to yield 95 g. of product. This product was distilled in vacuo to yield 70 g. (40%) of ethyl o-benzyloxymandelate, B.P. 164–165°/700 μ.

*Analysis.*—Calcd. for $C_{17}H_{18}O_4$ (M.W. 286.31): C, 71.30%; H, 6.33%. Found: C, 72.09%; H, 6.31%.

EXAMPLE 10

Ethyl α-(2-benzyloxyphenyl)-α-chloroacetate

Seventy grams (0.24 mole) of ethyl o-benzyloxy-mandelate was dissolved in 200 ml. of anhydrous benzene and 36 g. (0.3 mole) of thionyl chloride was added. The reaction mixture was allowed to stand at room temperature overnight. The solution was concentrated in vacuo and 50 ml. of ethanol was added to destroy excess thionyl chloride. The solution was again concentrated in vacuo to yield a 77 g. residue which was distilled to yield 67 g. (91%) of ethyl α-(2-benzyloxyphenyl)-α-chloroacetate, B.P. 157° C./350 μ.

Analysis.—Calcd. for $C_{17}H_{17}ClO_3$ (M.W. 304.77): C, 66.99%; H, 5.62%; Cl, 11.63%. Found: C, 67.39%; H, 5.65%; Cl, 11.12%.

EXAMPLE 11

Ethyl 2-(2-benzyloxyphenyl)-2,3-dihydro-3-hydroxycoumarilate

A mixture of 15.2 g. (0.05 mole) of ethyl α-(2-benzyloxyphenyl)-α-chloroacetate, 6.7 g. (0.055 mole) of salicylaldehyde, 14 g. of anhydrous potassium carbonate, 1 g. of potassium iodide and 30 ml. of methyl ethyl ketone was stirred and heated at reflux for four hours. The reaction mixture was cooled, diluted with 200 ml. of ether and filtered. The ether phase was washed with aqueous potassium carbonate solution and aqueous potassium sulfite solution. The solution was washed with water, dried over anhydrous magnesium sulfate, filtered and concentrated in vacuo to yield 17.6 g. (90%) of ethyl 2-(2-benzyloxyphenyl)-2,3-dihydro-3-hydroxycoumarilate.

EXAMPLE 12

2-(2-benzyloxyphenyl)-2,3-dihydro-3-hydroxy-coumarilic acid

A solution of 5 g. of potassium hydroxide in 250 ml. of methanol was added to 17.6 of ethyl 2-(2-benzyloxyphenyl)-2,3-dihydro-3-hydroxycoumarilate in 250 ml. of methanol. The solution was allowed to stand at room temperature overnight. Then 15 ml. of 6.1 N hydrochloric acid was added and the reaction mixture was concentrated to dryness in vacuo. The product was taken up in ether and the ether solution was extracted with aqueous potassium carbonate solution. The carbonate phase was separated, acidified with concentrated hydrochloric acid and extracted with ether. The ether solution was dried over anhydrous magnesium sulfate, filtered and concentrated in vacuo to yield 4 g. (30%) of 2-(2-benzyloxyphenyl)-2,3-dihydro-3-hydroxycoumarilic acid.

EXAMPLE 13

2-(2-benzyloxyphenyl) benzofuran

Four grams (0.012 mole) of 2-(2-benzyloxyphenyl)-2,3-dihydro-3-hydroxycoumarilic acid was dissolved in 40 ml. of quinoline and the solution was heated for 1 hour at 180–190° C. The solution was cooled to room temperature and 500 ml. of ether was added. The ether solution was washed with dilute hydrochloric acid and water. The ether solution was dried over anhydrous magnesium sulfate, filtered and concentrated in vacuo to yield 3.5 g. of 2-(2-benzyloxyphenyl)benzofuran.

EXAMPLE 14

2-(2-hydroxyphenyl)benzofuran 2-(2-benzyloxyphenyl)benzofuran (0.75 g.) was dissolved in 12 ml. of glacial acetic acid and 6 ml. of concentrated hydrochloric acid was added. The solution was heated at 65° C. for one hour. The reaction mixture was diluted with water and the product was isolated by extraction with chloroform. The chloroform solution was washed with aqueous potassium carbonate solution and then with water. The chloroform solution was dried over anhydrous magnesium sulfate, filtered and concentrated in vacuo to yield 0.26 g. of 2-(2-hydroxyphenyl)benzofuran.

While the foregoing examples have illustrated in detail the preparation of 2-(4-hydroxyphenyl)benzofuran and 2-(2-hydroxyphenyl)benzofuran by methods which are somewhat different, in the order of benzylation for example, it is to be understood that these methods are in general interchangeable. The particular reaction sequence utilized is purely a matter of choice and does not form any essential part of the instant invention.

The 3-hydroxy derivative may accordingly be prepared in an analogous fashion. Other hydroxyphenyl benzofurans which may be prepared using the processes of the instant invention include disubstituted phenyl benzofurans wherein at least one of the substituents is a hydroxyl group as well as other poly-substituted phenyl benzofurans. Illustrative of these compounds are 2-(2-hydroxy-3-methoxyphenyl)benzofuran, 2-(4-hydroxy-3-methoxyphenyl)benzofuran, and 2-(2,4-dihydroxyphenyl)benzofuran.

Various changes and modifications of this invention can be made and to the extent that such variations incorporate the spirit of this invention, they are intended to be included within the scope of the appended claims.

I claim:

1. A process for the production of 2-hydroxyphenylbenzofurans which comprises reacting a hydroxy benzaldehyde with a benzyl halide wherein the halogen is selected from the group consisting of chlorine and bromine, thereby forming the corresponding benzyloxy benzaldehyde, reacting said benzyloxy benzaldehyde with hydrogen cyanide to form the corresponding cyanohydrin, esterifying the cyano group of said cyanohydrin, reacting the resulting ester with thionyl chloride to form the corresponding substituted α-chloroacetate, reacting said α-chloroacetate with an ortho-hydroxybenzaldehyde in the presence of an alkaline condensing agent to form the corresponding hydroxy coumarilate, saponifying and thereafter acidifying said hydroxy coumarilate to form the corresponding coumarilic acid, heating to decarboxylate and dehydrate said coumarilic acid, thereby forming the corresponding 2-benzyloxyphenylbenzofuran and finally reacting said 2-benzyloxyphenylbenzofuran with hydrochloric acid to form the corresponding 2-hydroxyphenylbenzofuran.

2. A process for the production of a compound having the structural formula

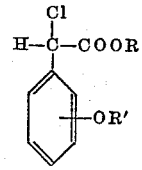

wherein R is a lower alkyl radical and R' is a benzyl radical, which comprises reacting a hydroxy benzaldehyde with a benzyl halide, wherein the halogen is selected from the group consisting of chlorine and bromine, thereby forming the corresponding benzyloxy benzaldehyde, reacting said benzyloxy benzaldehyde with hydrogen cyanide to form the corresponding cyanohydrin, esterifying the cyano group of said cyanohydrin, and reacting the resulting ester with thionyl chloride to form the corresponding substituted α-chloroacetate.

3. Ethyl α-(2-benzyloxyphenyl)-α-chloroacetate.

References Cited in the file of this patent

UNITED STATES PATENTS 2,636,885    Wynn _____ Apr. 28, 1953

OTHER REFERENCES

Beilstein: Vol. XVII/XIX, p. 77 (2388–2389).
Kruber et al.: Chem. Berichte, vol. 84, pp. 831–3 (1951).